(12) United States Patent
Appala et al.

(10) Patent No.: US 11,463,429 B2
(45) Date of Patent: Oct. 4, 2022

(54) NETWORK CONTROLS FOR APPLICATION ACCESS SECURED BY TRANSPORT LAYER SECURITY (TLS) USING SINGLE SIGN ON (SSO) FLOW

(71) Applicant: Cisco Technology, Inc., San Jose, CA (US)

(72) Inventors: Syam Sundar Appala, Santa Clara, CA (US); Sanjay Kumar Hooda, Pleasanton, CA (US); Rex E. Fernando, Fremont, CA (US); Vikram Pendharkar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 51 days.

(21) Appl. No.: 17/070,415

(22) Filed: Oct. 14, 2020

(65) Prior Publication Data

US 2022/0116382 A1    Apr. 14, 2022

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04L 9/40 | (2022.01) | |

(52) U.S. Cl.
CPC ........ *H04L 63/0815* (2013.01); *H04L 63/166* (2013.01)

(58) Field of Classification Search
CPC .......................... H04L 63/0815; H04L 63/166
See application file for complete search history.

(56) References Cited

U.S. PATENT DOCUMENTS

| | | | | |
|---|---|---|---|---|
| 2018/0295134 | A1* | 10/2018 | Gupta | ................... H04L 63/029 |
| 2019/0075115 | A1* | 3/2019 | Anderson | .............. H04L 63/083 |
| 2022/0006800 | A1* | 1/2022 | Duchastel | ........... H04L 63/0823 |

* cited by examiner

*Primary Examiner* — Amie C. Lin
(74) *Attorney, Agent, or Firm* — Merchant & Gould P.C.

(57) ABSTRACT

Network controls for application access secured by transport layer security (TLS) using single sign on (SSO) flow may be provided. An application access request for authenticating a user may be received in response to the user requesting an access to an application. User credentials associated with the user may be validated. In response to validating the user credentials, user attributes associated with the user may be determined. Network controls for a user session associated with the application access request may be determined based on the user attributes. The application access request may be redirected to a plain text user session. The plain text user session may comprise the network controls for the user session.

20 Claims, 4 Drawing Sheets

NETWORK CONTROLS FOR APPLICATION ACCESS SECURED BY TRANSPORT LAYER SECURITY (TLS) USING SINGLE SIGN ON (SSO) FLOW

TECHNICAL FIELD

The present disclosure relates generally to transport layer security, and more particularly to provisioning and enforcing network controls on application access secured by transport layer security using single sign on flow.

BACKGROUND

Transport Layer Security (TLS) is a protocol that may facilitate private communication between two entities. The two entities may include a client endpoint of an internet user and an application provider server. The TLS protocol may prevent any third-party devices from eves dropping on the communication between the two endpoints. However, this may make it difficult for network elements to apply policy decisions to network traffic between the client endpoint and the application provider server.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
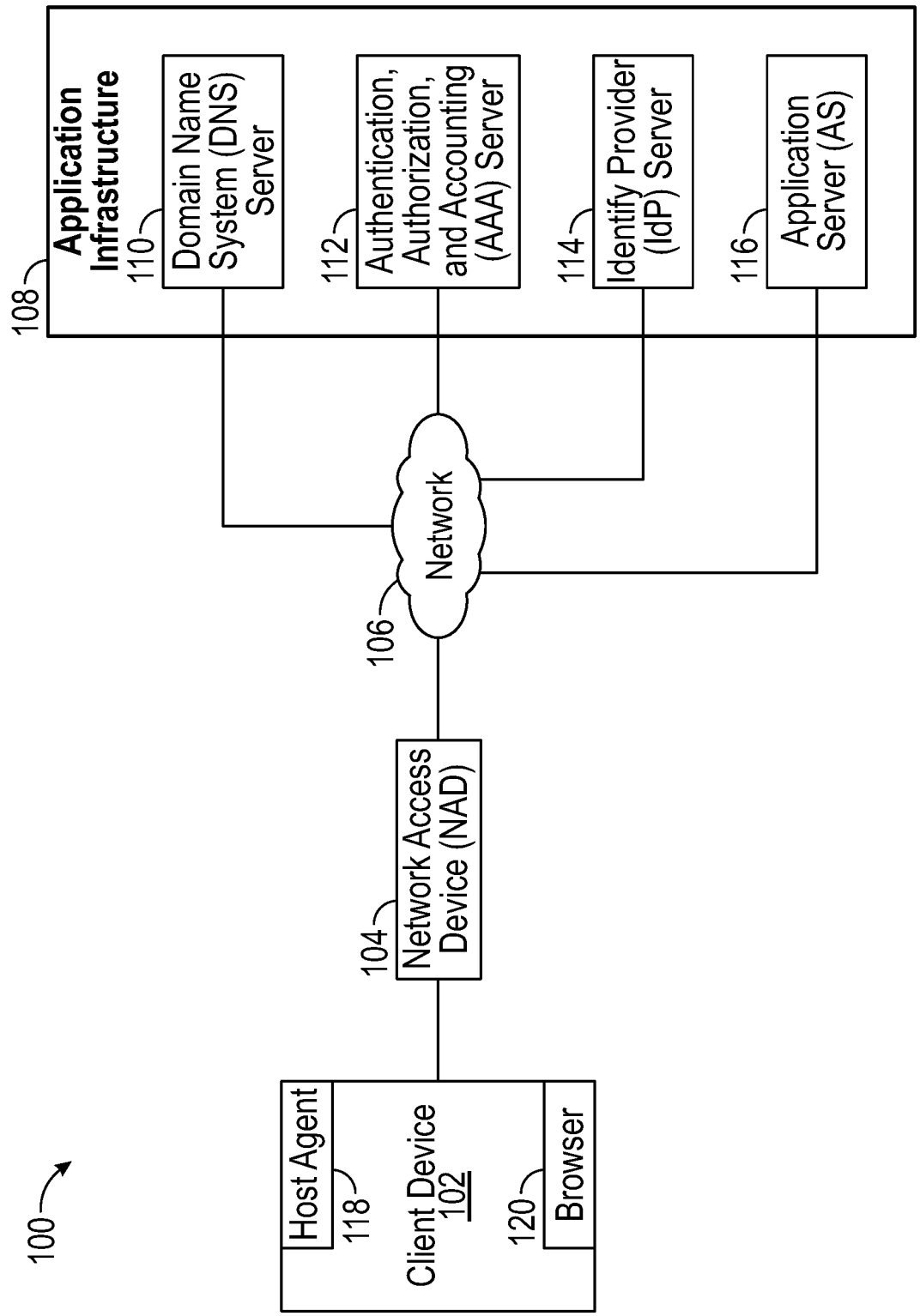
FIG. 1 shows an example operating environment.

Network controls for application access secured by Transport Layer Security (TLS) using Single Sign On (SSO) flow may be provided. An application access request for authenticating a user may be received in response to the user requesting an access to an application. User credentials associated with the user may be validated. In response to validating the user credentials, user attributes associated with the user may be determined. Network controls for a user session associated with the application access request may be determined based on the user attributes. The application access request may be redirected to a plain text user session. The plain text user session may comprise the network controls for the user session.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Transport Layer Security (TLS) may comprise a protocol that may facilitate private communication between a client endpoint of an internet user and an application server of an application provider. For example, a TLS handshake procedure may allow the client endpoint and the application server to exchange cryptographic keys and negotiate an encryption process. The cryptographic keys may be generated for each user session before any data of the communication may be transmitted. In addition, cryptographic keys may be different for each user session and each payload in each session may be encrypted.

Because each user session may be encrypted from the client endpoints and the cryptographic keys may be secure and unavailable to network elements between the client endpoint and the application server, the network elements that are not terminating the user session may not be able to determine flow characteristics of the user session without terminating the user session. For example, the network elements may need to determine the user session characteristics of the flow to apply policy decisions, such as, performing access control and associating priority to the flow, etc., to the user session.

Embodiments of the disclosure may provision and enforce network controls on application access that is secured by TLS using a Single Sign On (SSO) server, for example, an Identity Provider (IdP) server. The IdP server may determine the network controls, such as, a Quality of Service (QoS), access control, path selection, etc. that network devices may enforce on an application access flow. For example, the IdP server may determine flow characteristics of the application access flow secured by TLS based on user attributes and device attributes. The IdP server may receive the user credentials and device credentials in response to an application server receiving an application access request from the user from a user device.

The IdP server may validate the user credentials solicited from the user with identity stores, for example, an Active Directory (AD) server. In example embodiments, the IdP server may validate the device credentials obtained from a host agent running on the user device or through mechanisms such as a Multi-Factor Authentication (MFA) with a Device Management (DM) server, for example, a Mobile Device Management (MDM) server. Alternatively, and in accordance with example embodiments, the IdP server may fetch a user context and a device context from an Authentication, Authorization, and Accounting (AAA) server using the user credentials. In addition, the IdP server may determine characteristics of the application being accessed, for example, an identity of an application and a type of application being accessed from an application server.

The IdP server may determine network controls, for example, Quality of Service (QoS), path selection, and priority, for the user session based on the determined the user attributes and the device attributes. For example, the IdP server may perform a network authorization policy lookup in a data store where policies may be stored. The policies may be configured by an administrator using the user attributes, the device attributes, network attributes, and stored in the data store. The IdP server then may provide the network controls to a network element, for example, a Network Access Device (NAD), in a plain text session, for example, a Hytertext Transfer Protocol (HTTP) session. In example embodiments, the plain text session may be decodable by the NAD. The NAD may retrieve and may store the network controls and a Flow Identity (ID) for the user session from the HTTP session. The network access device then may apply the network controls to data traffic associated with the user session. Accordingly, embodiments of the disclosure may enable the network access device to implement network controls to an encrypted user session, for example, a TLS user session or an HTTP Secure (HTTPS) session.

FIG. 1 shows an example operating environment 100 in which embodiments of the disclosure may be practiced consistent with embodiments of the disclosure. For example, operating environment 100 may comprise a client device 102, a Network Access Device (NAD) 104, a network 106, and an application infrastructure 108. Application infrastructure 108 may comprise a Domain Name System (DNS) server 110, an Authentication, Authorization, and Accounting (AAA) server 112, an Identity Provider 114, and an Application Server (AS) 116. Client device 102 may include a host agent 118 and a browser 120.

Client device 102, which may also be referred to as a client endpoint, may comprise, but is not limited to, a smartphone, a tablet device, a personal computer, a mobile device, an Internet-of-Things (IoT) device, a cellular base station, a telephone, a remote control device, a set-top box, a digital video recorder, a cable modem, a network computer, a mainframe, a router, or other similar microcomputer-based device capable of accessing and using a Wi-Fi network or a cellular network. Host agent 118 of client device 102 may be an agent, for example, any connect agent, operative to connect and authenticate client device 102 with a network infrastructure. Browser 120 of client device 102 may be used to access an application hosted by application infrastructure 108.

NAD 104 may comprise subscriber equipment used to connect client device 102 to network 106 which, for example, may comprise a Wide Area Network (WAN) (e.g., the Internet). NAD 104 may comprise, but is not limited to, a router, a modem, a wireless access point, or an Ethernet switch for example. Network 106 may represent the Internet, which itself may involve a combination of wired and wireless links over which communication occurs between client device 102 and application infrastructure 108 or between components of application infrastructure 108.

DNS server 110 of application infrastructure 108 may translate a domain name to an Internet Protocol (IP) address. For example, DNS server 110 may translate the domain name to an IP address for locating and identifying services and devices with underlying network protocols.

AAA server 112 of application infrastructure 108 may be used for an user or a device authentication. For example, AAA server 112 may validate the user credentials with an identity store, for example, an Active Directory (AD) server. AAA server 112 may gather addition details on users and client device 102 and use the gathered additional information on the users and client device 102 to evaluate network authorization policies and determine what they can access in environment 100. The user attributed and the device attributes may broadly be referred to as user context and AAA server 112 may expose it to IdP server 114. IdP server 114 may create, maintain, and manage identity information for users. IdP server 114 may provide authentication services to relying applications. IdP server 114 may also be referred to as a SSO server for example. In example embodiments, IdP server 114 may use identity stores, for example, the AD server, for user credential validation instead of AAA server 112. AS 116 may host a plurality of applications that may be accessible to client device 102 over network 106. The plurality of applications may be applications created by an entity for their own use or Software as a Service (SaaS) applications.

The elements described above of operating environment 100 (e.g., client device 102, network access device 104, application infrastructure 108, DNS server 110, AAA server 112, IdP server 114, and AS 116) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
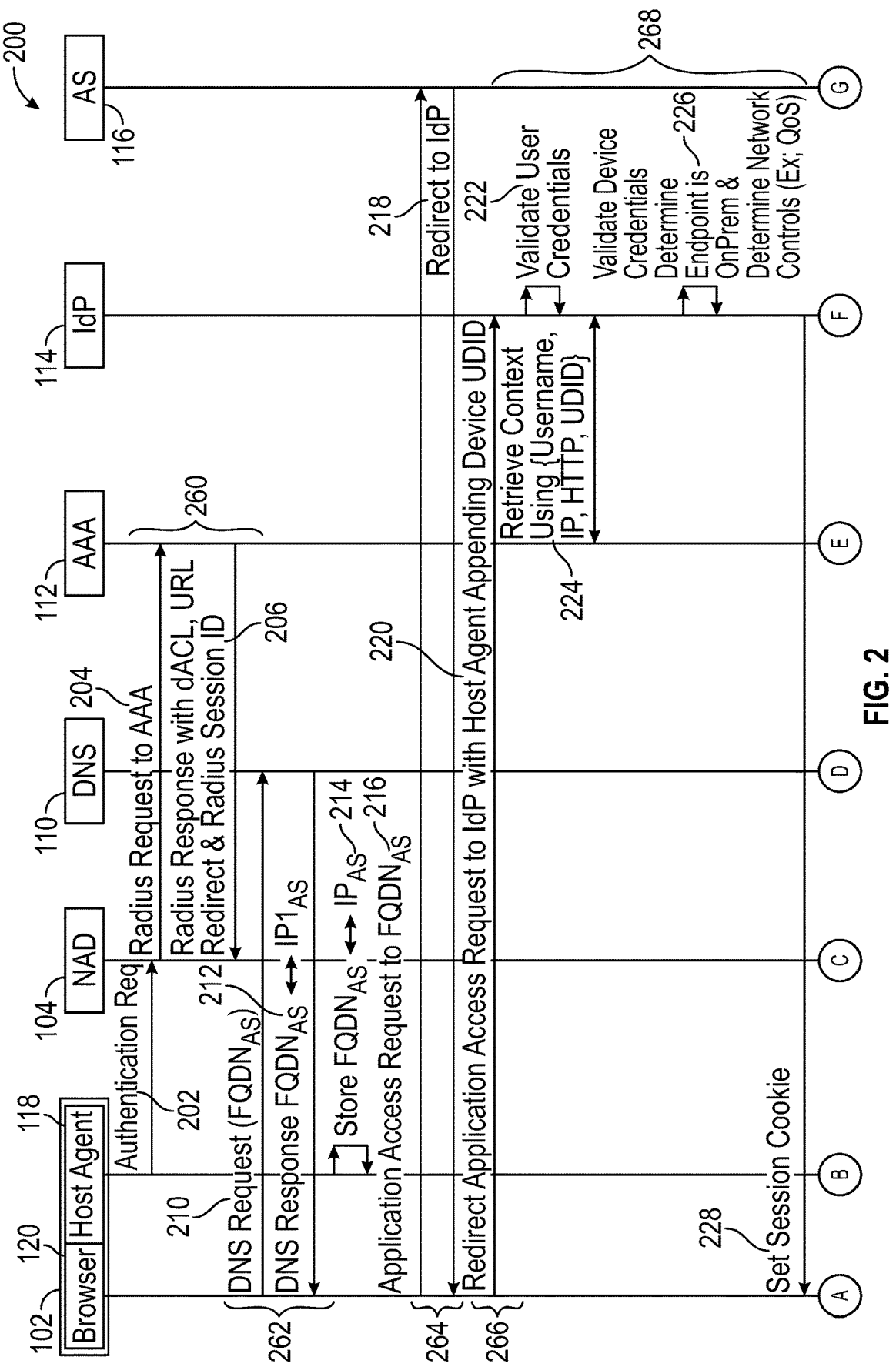
FIG. 2 is a flow diagram of a method for providing network controls for Transport Layer Security (TLS) application's access using Single Sign On (SSO) flow.
Figure 2:
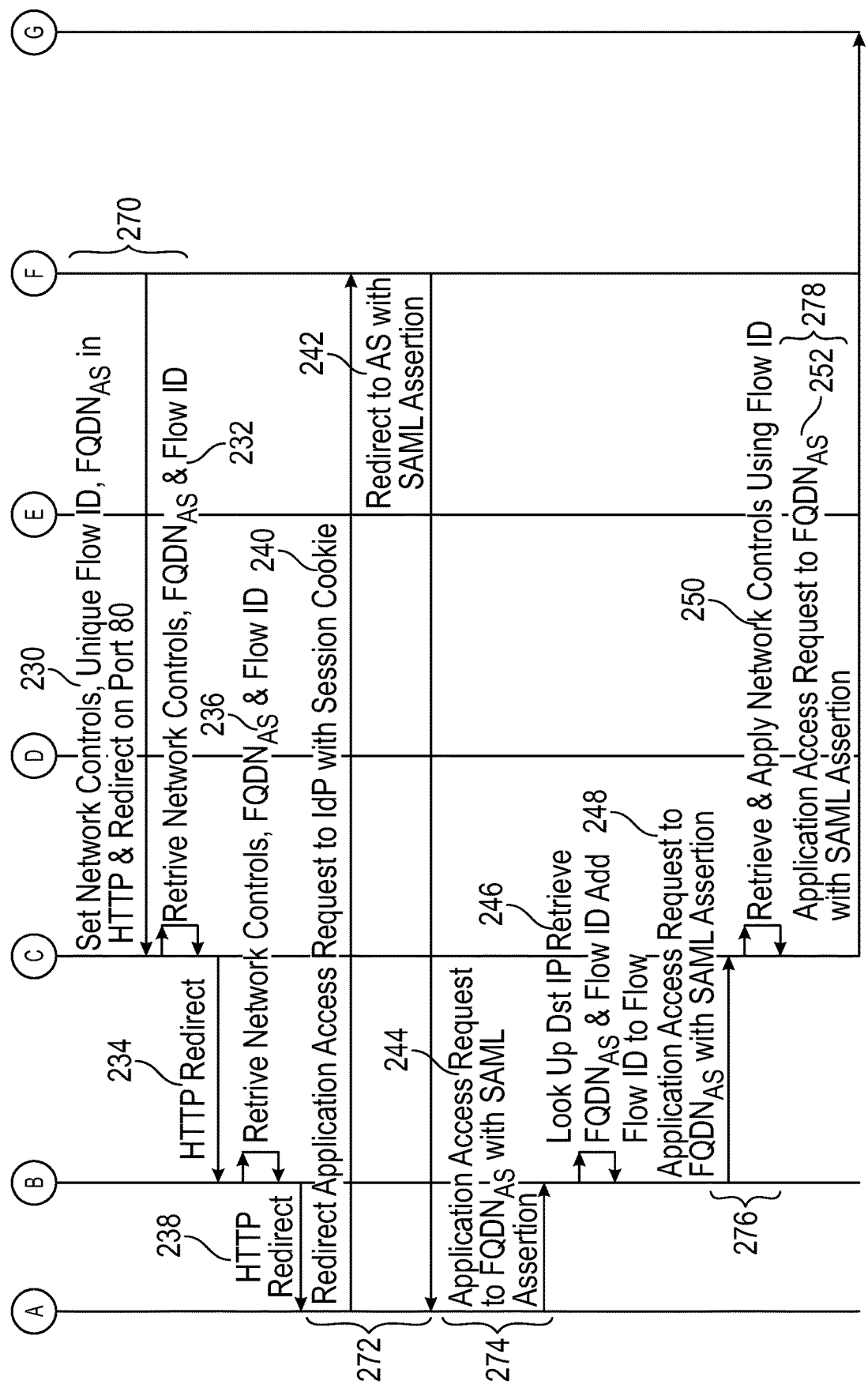

FIG. 2 is a flow diagram setting forth the general stages involved in a method 200 consistent with an embodiment of the disclosure for provisioning and enforcing network controls on application access secured by TLS using a SSO server, for example, IdP server 114, in operating environment 100. Method 200 may be implemented in operating environment 100 through IdP server 114 as described in more detail above with respect to FIG. 1. A computing device 300, as described in more detail below with respect to FIG. 3, may comprise an operating environment for IdP server 114. Ways to implement the stages of method 200 will be described in greater detail below.

At stage 202 of method 200, host agent 118 may initiate an authentication request. For example, client device 102 may connect to NAD 104. Host agent 118 on user device may detect that a link between client device 102 and NAD is up and may send the authentication request to NAD 104. In example embodiments, the authentication request may include user credentials for an user associated with client device 102.

After host agent 118 initiates the authentication request at state 202, method 200 may proceed to stage 204 where a Remote Authentication Dial-in User Service (RADIUS) request may be sent to AAA server 112. For example, NAD 104, in response to host agent 118 initiating the authentication request, may create the RADIUS request comprising the user credentials supplied by host agent 118 and may send the RADIUS request to AAA server 112.

Once NAD 104 sends the RADIUS request to AAA server 112 at stage 204, method 200 may proceed to stage 206 where a RADIUS response may be received. The RADIUS response may be received at network access device 104 from AAA server 112. The RADIUS response may include a downloadable Access Control List (dACL), a Uniform Resource Locator (URL) redirect, and a RADIUS session ID. For example, AAA server 112 may validate the user credentials with an active directory and send back the RADIUS response with dACL and the URL redirect on port 80 or port 443. In example embodiments, stage 204 and stage 206 of method 200 may together be referred to as client device 102 network authentication stage 260 or a static configuration stage where client device 102 may receive an Internet Protocol (IP) address.

In example embodiments, AAA server 112 may send the RADIUS response to NAD 104 for NAD 104 to append the RADIUS session ID for the user's active RADIUS session whenever NAD 104 may see a request made to IdP server 114 on port 80 or port 443. The request to IdP server 114 may be made when the user accesses an SSO enabled application. A purpose of passing the RADIUS session ID to IdP server 114 may be for IdP server 114 to request to AAA server 112 using the RADIUS session ID and retrieve user attributes and device attributes known to AAA server 112. In example embodiments, AAA server 112 may have richer use attributes and device attributes based on network authentication capabilities and gathered device profiles, device compliance status, location, etc.

After receiving the RADIUS response at stage 206, method 200 may proceed to stage 210 where a DNS request may be sent. For example, the user of client device 102 may enter or type a domain name of the application to be accessed (e.g., www.example.com or www.salesforce.com) in browser 120 of client device 102. The domain name may be a common name for an application hosted by AS 116. A networking stack in client device 102 may generate a DNS request corresponding to the entered domain name to determine a Fully Qualified Domain Name associated with AS 116 ($FQDN_{AS}$) and an IP address associated with the application to be accessed. For example, browser 120 may instruct the networking stack in client device 102 to perform a DNS resolution to fetch an IP address for the entered domain name (e.g., www.example.com or www.salesforce.com). The networking stack in client device 102 may generate the DNS request corresponding to the domain name and may send the DNS request to DNS server 110.

After sending the DNS request to DNS server 110 at stage 210, method 200 may proceed to stage 212 where a DNS response may be received. For example, DNS server 110 may receive the DNS request and determine an IP address on AS 110 ($IP_{AS}$) corresponding to the domain name in the DNS request. DNS server 110 may create the DNS response comprising the determined $IP_{AS}$ and may send the DNS response to client device 102. In example embodiments, the $IP_{AS}$ may be dynamic and may change for different user sessions.

Once the DNS response comprising the $IP_{AS}$ is received at stage 212, method 200 may proceed to stage 214 where host agent 118 may store an association between the domain name and the corresponding $IP_{AS}$. For example, host agent 118 of client device 102 may intercept the DNS response and may retrieve the $IP_{AS}$ corresponding to the domain name. Host agent 118 then may store a mapping of the domain name and the corresponding $IP_{AS}$ (that is, $FQDN_{AS}$ and $IP_{AS}$). In example embodiments, stage 210, stage 212, and stage 214 of method 200 may together be referred to as endpoint browser application access stage 262.

After storing the association between the domain and the $IP_{AS}$ at stage 214, method 200 may proceed to stage 216 where an application access request may be sent or routed to the $FQDN_{AS}$. For example, because the $IP_{AS}$ for the application may be known, browser 120 of client device 102 may send a request to access an application on AS 116 to the $FQDN_{AS}$. In some example embodiments, the application access request may be sent to the $IP_{AS}$ associated with the domain name of the application. In other example embodiments, the application request may be sent using TLS protocol (e.g., a HTTPS session) that may be encrypted by browser 120.

After sending the application access request at stage 216, method 200 may proceed to stage 218 where a redirect to IdP server 114 response may be received. For example, AS 116 may receive the application access request from browser 120 and may generate a redirect response to IdP server 114 to validate the user before granting access to the requested application. AS 116 may send the redirect response to client device 102 or browser 120. In example embodiments, stage 216 and stage 218 of method 200 may together be referred to as application access request stage 264.

Once the redirect to IdP server 114 is received at stage 218, method 200 may proceed to stage 220 where the application access request may be redirected to IdP server 114. For example, after receiving the redirect to IdP server 114 response, client device 102 through browser 120 may redirect, for example, send, the application access request to IdP server 114. In example embodiments, host agent 118 may intercept the redirect and append a Universal Device Identifier (UDID) of client device 102 to the application access request. Stage 218 of method 200 may also be referred to as host agent 118 intercept and redirect stage 266.

After browser 120 redirects the application access request to IdP server 114 at stage 220, method 200 may proceed to stage 222 where user credentials associated with the application access request may be verified. For example, IdP server 114 may receive the application access request and provide a form on browser 120 prompting the user to provide user credentials, for example, a username and a password. IdP server 114 may receive the user credentials from browser 120 and validate the received user credentials. In addition, IdP server 114 may extract device attributes, for example, the IP address of client device 102 and the UDID of client device 102, from the application access request.

Once the user credentials of the user associated are validated with the application access request at stage 222, method 200 may proceed to stage 224 where a context for the application access request may be retrieved. For example, the context may include a user group for the user, authentication history of the user, a location of the user, characteristics of client device 102, risks associated with the user or client device 102, etc. IdP server 114 may retrieve context for the application access request from AAA server 112. The context may be retrieved using the username, the IP address, and the user device ID. For example, IdP server 114 may send a query to AAA server 112 for the context. AAA server 112 may include stored historical data regarding the user and client device 102 that it may provide to IdP server 114 in response to the query from IdP server 114 as the context. In some examples, IdP server 114 may choose to assemble the context itself by validating the user credentials with an identity store such as an Active Directory or by using the device UDID with a device management server.

After retrieving the context for the application access request at stage 224, method 200 may proceed to stage 226 where device credentials may be validated. For example, IdP server 114 may validate the device credentials of client device 102. In addition, IdP server 114 may determine that client device 102 is on premises. Based on the retrieved context, after verifying the device credentials, IdP server 114 may determine network controls for the user session associated with the application access request by performing authorization policies lookup. For example, IdP server 114 may determine a QoS and a priority for the user session associated with the application access request based on the context, the user attributes, and the device attributes associated with client device 102.

Once IdP server 114 determined the network controls for the user session at stage 226, method 200 may proceed to stage 228 where a session cookie may be set. For example, IdP server 114 may send a session cookie for the user session to client device 102 or browser 120. The session cookie may include information regarding the user session corresponding to the application access request. In some examples, the session cookie may be stored on client device 102. In example embodiments, stage 222, stage 224, stage 226, and stage 228 of method 200 together may also be referred to as endpoint user and device validation stage 268.

After IdP server 114 sets the session cookie for the user session at stage 228, method 200 may proceed to stage 230 where the application access request may be redirected to a plain text session. For example, IdP server 114 may create a plain text session (e.g., a HTTP session) corresponding to the application access request an redirect the application access request to itself on the HTTP session. In addition, IdP server 114 may include the network controls, a flow ID, and the $FQDN_{AS}$ for the user session in the HTTP session. IdP server 114 may send the HTTP session to browser 120 of client device 102.

Once IdP server 114 redirects the application access request to the HTTP session at stage 230, method 200 may proceed to stage 232 where network access device 104 may retrieve the network controls, the flow ID, and the $FQDN_{AS}$. In example embodiments, network access device 104 may retrieve the network controls, the flow ID, and the $FQDN_{AS}$ from intercepting the redirected application access request coming from IdP server 114 to client device 102. For example, network access device 104 may intercept the HTTP session and retrieve the network controls, the flow ID, and the $FQDN_{AS}$ for the user session from the HTTP session as the HTTP session may not be encrypted. Network access device 104 may store the retrieved network controls, flow ID, and $FQDN_{AS}$.

After network access device 104 retrieves the network controls, the flow ID, and the $FQDN_{AS}$ at stage 232, method 200 may proceed to stage 234 where the HTTP session may be redirected to browser 120 of client device 102. For example, network access device 104, after retrieving network controls, the flow ID, and the $FQDN_{AS}$, may let the HTTP session flow to browser 120.

Once network access device 104 redirected the HTTP session to host agent 118 at stage 234, method 200 may proceed to stage 236 where host agent 118 may retrieve the network controls, the flow ID, and the $FQDN_{AS}$. For example, host agent 118 may intercept the HTTP session and retrieve the network controls, the flow ID, and the $FQDN_{AS}$ from the HTTP session as the HTTP session may not be encrypted. Host agent 118 may store the retrieved network controls, flow ID, and $FQDN_{AS}$.

After host agent 118 retrieving the network controls, the flow ID, and the $FQDN_{AS}$ at stage 236, method 200 may proceed to stage 238 where the HTTP session may be redirected to browser 120. For example, host agent 118, after retrieving network controls, the flow ID, and the $FQDN_{AS}$, may let the HTTP session flow to browser 120 of client device 102. In example embodiments, stage 228, stage 230, stage 232, stage 234, and stage 236 may together be referred to as propagation of the network controls to network access device 104 and host agent 118 stage 270. In example embodiments, stage 230, stage 232, stage 234, stage 236, and stage 238 together may be referred to as IdP server 114 propagation of the network controls to network access device 104 and host agent 118 stage 270.

After host agent 118 redirecting the HTTP session to browser 120 at stage 238, method 200 may proceed to stage 240 where the application access request may be redirected to IdP server 114 with the session cookie. For example, browser 120 of client device 102 may redirect the application access request with the session cookie to IdP server 114.

Once browser 120 redirected the application access request with the session cookie to IdP server 114 at stage 240, method 200 may proceed to stage 242 where the application access request may be redirected to AS 116. For example, IdP server 114 may inspect the session cookie and may determine that the redirected application access request is same as the HTTP session it initiated and may redirect the application access request to application server 114. In example embodiments, IdP server 114 may redirect the application access request to application server 114 with Security Assertion Markup Language (SAML) assertion. The SAML assertion may allow IdP 110 to pass authorization credentials to application server 114. The redirected application access request with the SAML assertion may be received at browser 120. In example embodiments, stage 240 and stage 242 of method 200 together may be referred to as the HTTP redirect from client device 102 to IdP server 114 stage 272.

After IdP server 114 redirects the application access request with the SAML assertion to AS 116 at stage 242, method 200 may proceed to stage 244 where the application access request with the SAML assertion may be sent to AS 116. In example embodiments, stage 244 of method 200 may also be referred to as client device 102 to send HTTPS with SAML assertion to AS 116 stage 274.

Once browser 120 sends the application access request with the SAML assertion to AS 116 at stage 244, method 200 may proceed to stage 246 where host agent 118 may look up a destination IP in the application access request and may retrieve the $FQDN_{AS}$ and the flow ID for the application access request. For example, host agent 118 may have the $FQDN_{AS}$ and the flow ID stored thereon from intercepting the HTTP session. Host agent 118 may add the retrieved flow ID to the application access request.

After host agent 118 retrieves and adds the flow ID to the application access request at stage 246, method 200 may proceed to stage 248 where host agent 118 may send the application access request with the SAML assertion to the $FQDN_{AS}$. For example, after retrieving and adding the flow ID to the application access request, host agent 118 may send the application access request with the SAML assertion to the $FQDN_{AS}$.

Once host agent 118 sends the application access request with the SAML assertion to the $FQDN_{AS}$ at stage 248, method 200 may proceed to stage 250 where network access device 104 may retrieve and apply the network controls using the flow ID. For example, network access device 104 may retrieve the flow ID inserted by host agent 118 in the application access request. From the flow ID, network access device 104 may retrieve the network controls for the flow ID it received from the IdP server 114. Network access device 104 may apply the retrieved network controls to the application access request. In example embodiments, stage 248 of method 200 may also be referred to as network access device 104 to apply the network control stage 276.

After network access device 104 retrieves and applies the network controls to the application access request at stage 250, method 200 may proceed to stage 252 where network access device 104 may send the application access request with the SAML assertion to the $FQDN_{AS}$. For example, after retrieving and applying the network controls to the application access request, network access device 104 may send the application access request with the SAML assertion to the $FQDN_{AS}$. In example embodiments, stage 252 of method 200 may also be referred to AS 116 receives the HTTPS with the SAML assertion stage 278.

Figure 3:
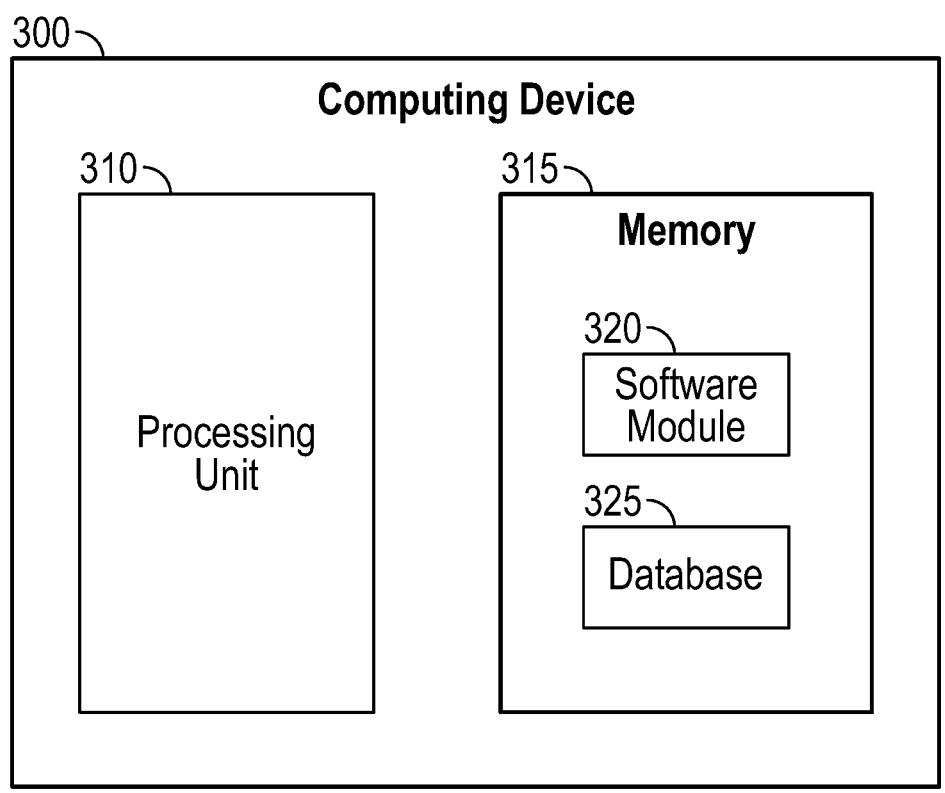
FIG. 3 shows a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for provisioning and enforcing network controls on a TLS application's access using an SSO server, including, for example, any one or more of the stages from method 200 described above with respect to FIG. 2. Computing device 300, for example, may provide an operating environment for any client device 102, network access device 104, application infrastructure 106, DNS server 110, AAA server 112, IdP server 114, and AS 116. Client device 102, network access device 104, application infrastructure 106, DNS server 110, AAA server 112, IdP server 114, and AS 116 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving an application access request for authenticating a user in response to the user requesting an access to an application;
   validating user credentials associated with the user;
   determining, in response to validating the user credentials, user attributes associated with the user;
   determining, based on the user attributes, network controls for a user session associated with the application access request; and
   redirecting the application access request to a plain text user session, wherein redirecting the application access request to the plain text user session comprises creating the plain text user session corresponding to the application access request and redirecting the application access request to the plain text user session, wherein the plain text user session comprises the network controls and a flow identifier for the user session, wherein a network access device retrieves and stores the network controls and the flow identifier for the user session from the plain text user session, and wherein the network access device applies the network controls to the user session.

2. The method of claim 1, further comprising storing first data associated with the user session on a client device associated with the user, wherein the first data comprises a session cookie for the user session.

3. The method of claim 2, further comprising:
   receiving, in response to redirecting the application access request to the plain text user session, a redirected application access request with the session cookie; and
   redirecting, in response to receiving the redirected application access request with the session cookie, the redirected application access request to an application server confirming validation of the user credentials.

4. The method of claim 3, wherein redirecting the redirected application access request to the application server confirming validation of the user credentials comprises:
   determining, based on the session cookie, that the redirected application access request is associated with the application access request;
   including a security assertion markup language assertion confirming validation of the user credentials in the redirected application access request; and
   redirecting the redirected application access request with the security assertion markup language assertion confirming validation of the user credentials to the application server.

5. The method of claim 1, wherein receiving the application access request for authenticating the user comprises:
   receiving, by an application server, the application access request for accessing the application hosted by the application server; and
   redirecting, by the application server to an identity provider server, the application access request for authenticating the user for accessing the application hosted by the application server.

6. The method of claim 1, wherein receiving the application access request for authenticating the user comprises receiving the application access request for authenticating the user as a secured user session comprising a Hypertext Transport Protocol Secure (HTTPS) session.

7. The method of claim 1, wherein receiving the application access request for authenticating the user comprises receiving the application access request for authenticating the user as a secured user session comprising a Transport Layer Security (TLS) user session.

8. The method of claim 1, wherein receiving the application access request for authenticating the user comprises receiving the application access request for authenticating the user, wherein the application access request comprises a username, and wherein validating the user credentials of the user comprises validating the user credentials based on the username.

9. The method of claim 1, wherein determining the user attributes comprises determining the user attributes from an authentication, authorization, and accounting server.

10. A non-transitory computer-readable medium that stores a set of instructions which when executed by a processor perform a method comprising:
    receiving an application access request for authenticating a user in response to the user requesting an access to an application from an application server;
    validating user credentials associated with the user;
    determining, in response to validating the user credentials, user attributes associated with the user;
    determining, based on the user attributes, network controls for a user session associated with the application access request, the network controls comprising at least one of the following: a quality of service and a priority for the user session; and
    redirecting the application access request to a plain text user session, wherein redirecting the application access request to the plain text user session comprises creating the plain text user session corresponding to the application access request and redirecting the application access request to the plain text user session, wherein the plain text user session comprises the network controls and a flow identifier for the user session, wherein a network access device retrieves and stores the network controls and the flow identifier for the user session from the plain text user session, and wherein the network access device applies the network controls to the user session.

11. The non-transitory computer-readable medium of claim 10, wherein receiving the application access request for authenticating the user comprises:
    receiving, by the application server, the application access request for accessing the application hosted by the application server; and
    redirecting, by the application server to an identity provider server, the application access request for authenticating the user for accessing the application hosted by the application server.

12. The non-transitory computer-readable medium of claim 10, wherein receiving the application access request for authenticating the user comprises receiving the application access request for authenticating the user as a secured user session comprising a Hypertext Transport Protocol Secure (HTTPS) session.

13. The non-transitory computer-readable medium of claim 10, wherein receiving the application access request for authenticating the user comprises receiving the application access request for authenticating the user as a secured user session comprising a Transport Layer Security (TLS) user session.

14. The non-transitory computer-readable medium of claim 10, wherein determining the user attributes comprises determining the user attributes from an authentication, authorization, and accounting server.

15. The non-transitory computer-readable medium of claim 10, further comprising:

storing first data associated with the user session on a client device associated with the user, wherein the first data comprises a session cookie for the user session;

receiving, in response to redirecting the user session to the plain text user session, a redirected application access request with the session cookie; and redirecting, in response to receiving the redirected application access request with the session cookie, the redirected application access request to an application server confirming validations of the user credentials.

16. The non-transitory computer-readable medium of claim 10, wherein receiving the application access request for authenticating the user comprises receiving the application access request for authenticating the user, wherein the application access request comprises a username, and wherein validating the user credentials of the user comprises validating the user credentials based on the username.

17. An apparatus comprising:
a memory storage; and
a processor coupled to the memory storage, wherein the processor is operative to:
receive an application access request for authenticating a user in response to the user requesting an access to an application;
validate user credentials associated with the user;
determine, in response to validating the user credentials, user attributes associated with the user;
determine, based on the user attributes, network controls for a user session associated with the application access request; and
redirect the application access request to a plain text user session, wherein the processor being operative to redirect the application access request to the plain text user session comprises the processor being operative to create the plain text user session corresponding to the application access request and redirect the application access request to the plain text user session, wherein the plain text user session comprises the network controls and a flow identifier for the user session, wherein a network access device retrieves and stores the network controls and the flow identifier for the user session from the plain text user session, and wherein the network access device applies the network controls to the user session.

18. The apparatus of claim 17, wherein the processor is further operative to:
store first data associated with the user session on a client device associated with the user, wherein the first data comprises a session cookie for the user session;
receive, in response to redirecting the user session to the plain text user session, a redirected application access request with the session cookie; and
redirect, in response to receiving the redirected application access request with the session cookie, the redirected application access request to an application server confirming validation of the user credentials.

19. The apparatus of claim 18, wherein the processor being operative to redirect the redirected application access request to the application server confirming validation of the user credentials comprises the processor being operative to:
determine, based on the session cookie, that the redirected application access request is associated with the application access request;
include a security assertion markup language confirming validation of the user credentials in the redirected application access request; and
redirect the redirected application access request with the security assertion markup language confirming validation of the user credentials to the application server.

20. The apparatus of claim 17, wherein the processor being operative to receive the application access request for authenticating the user comprises the processor being operative to:
receive, by a service provider, the application access request for accessing the application hosted by an application server; and
redirect, by the application server to an identity provider server, the application access request for authenticating the user for accessing the application hosted by the application server.

* * * * *